United States Patent [19]

Berg et al.

[11] Patent Number: 4,624,345
[45] Date of Patent: Nov. 25, 1986

[54] VEHICLE SLACK ADJUSTERS

[75] Inventors: Arthur A. Berg, Northbrook; Frederic Lissau, Chicago, both of Ill.

[73] Assignee: Sloan Valve Company, Franklin Park, Ill.

[21] Appl. No.: 630,771

[22] Filed: Jul. 13, 1984

Related U.S. Application Data

[63] Continuation-in-part of Ser. No. 598,487, Apr. 9, 1984, abandoned.

[51] Int. Cl.$^4$ .............................................. F16D 65/46
[52] U.S. Cl. .................................. 188/196 M; 74/522; 188/79.5 K
[58] Field of Search ................... 74/519, 522, 525; 188/79.5 K, 196 M, 196 BA, 217, 382

[56] References Cited

U.S. PATENT DOCUMENTS 1,689,235 10/1928 Fowler et al. .................. 188/79.5 K Primary Examiner—Duane A. Reger Attorney, Agent, or Firm—Kinzer, Plyer, Dorn & McEachran

[57] ABSTRACT

A slack adjuster for use in a transportation environment has a body which has a lever arm formed at one end thereof. There is a crosshole or passage in the body and a worm gear wheel is positioned in the passage for mounting on a brake operating shaft. There is a slot formed in the body and opening into the passage. The slot has three mutually perpendicular surfaces and is of a size and shape to hold a worm gear and to provide for threaded engagement of the worm gear and the worm gear wheel. There is a bore in the body which is generally perpendicular to one of the slot's mutually perpendicular surfaces. A shaft is positioned in the bore and coaxially mounts the worm gear for adjustment thereof. The bore is oversized relative to the shaft, thereby providing no bearing support therefor. A torque applied to the worm gear wheel from the body lever arm applies a resultant force, having a component perpendicular to and a component parallel with the worm gear axis, from the worm gear to the slot's perpendicular surfaces.

24 Claims, 12 Drawing Figures

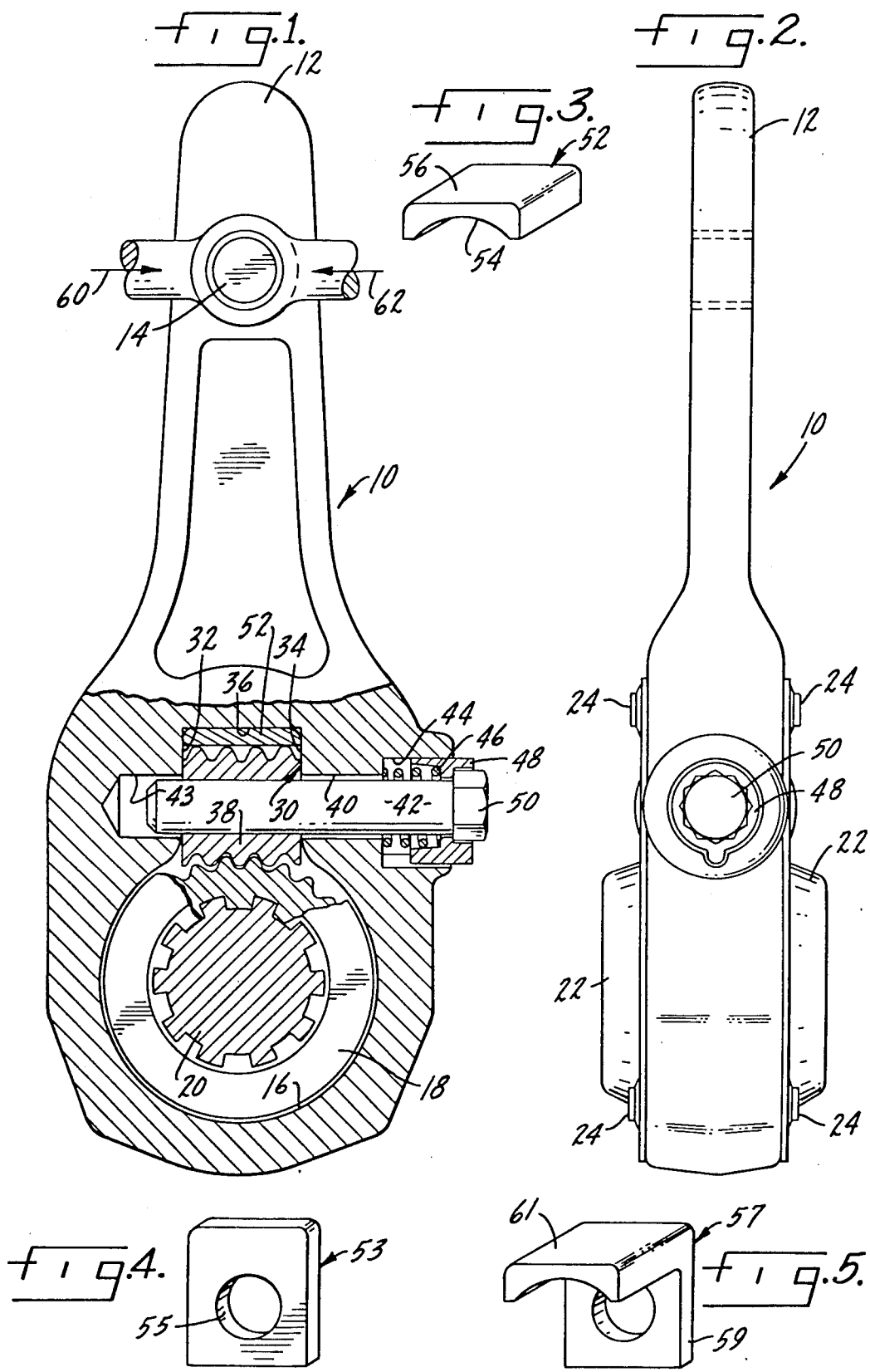

VEHICLE SLACK ADJUSTERS

This application is a continuation-in-part of application Ser. No. 598,487, filed Apr. 9, 1984, now abandoned.

SUMMARY OF THE INVENTION

The present invention relates to slack adjusters for use in a transportation environment and specifically slack adjusters for use in over-the-road vehicles such as trucks or the like.

A primary purpose of the invention is a slack adjuster of the type described which is so constructed as to diminish the stress applied to the slack adjuster body during operation thereof.

Another purpose is to provide a slack adjuster design which eliminates close machine tolerances of the crosshole for the adjusting shaft.

Another purpose is a slack adjuster of the type described, the construction of which provides for considerably less stress load per square inch and, therefore, permits the use of lighter weight forgings than have been heretofore possible with conventional slack adjuster designs.

Another purpose is a slack adjuster of the type described which, through the use of an insert, reduces high stress concentrated loading on portions of the slack adjuster body.

Another purpose is a slack adjuster with a mounting or connection between the worm gear and adjustment shaft which does not weaken or cause a weakening of the worm gear as a result of heat, for example, treatment.

Another purpose is a slack adjuster of the above type with an interfit end or connection between the worm gear and adjustment shaft which, while not weakening the worm gear, will also resist pullout loads.

Another purpose is a slack adjuster of the above type with an interfit between the body of the worm gear and the adjustment shaft that resists pullout.

Another purpose is a slack adjuster of the above type with conical and trunnion type inserts that reduce high stress concentration.

Other purposes will appear in the ensuing specification, drawings and claims.

BRIEF DESCRIPTION OF THE DRAWINGS

The invention is illustrated diagrammatically in the following drawings wherein:

FIG. 1 is a side view of a slack adjuster, in part section,

FIG. 2 is an end view of the slack adjuster of FIG. 1,

FIG. 3 is a perspective of one style insert designed to reduce high stress loadings due to the vertical thrust of the worm of the slack adjuster of FIGS. 1 and 2, FIG. 4 is a perspective of one style insert designed to reduce high stress loadings due to the horizontal thrust of the worm of the slack adjuster of FIGS. 1 and 2, FIG. 5 is a perspective of one style insert which combines features to reduce either or both vertical and/or horizontal thrusts of the worm of the slack adjuster of FIGS. 1 and 2.

DESCRIPTION OF THE PREFERRED EMBODIMENT

Figure 6:
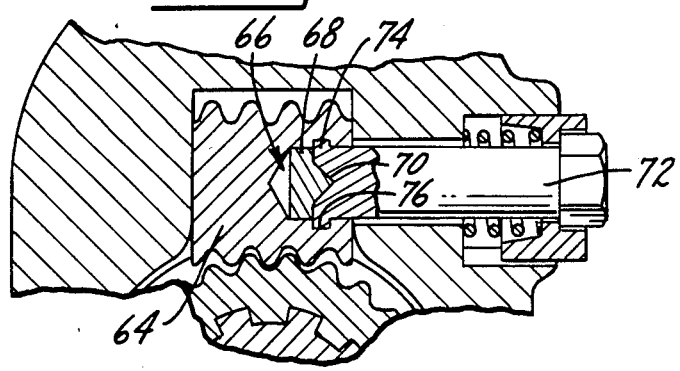
FIG. 6 is a partial view similar to FIG. 1 of a variant form.

The present invention relates to slack adjusters of the type normally used on over-the-road vehicles such as tractor-trailer combinations. The invention is shown herein applied to a manual slack adjuster in that there is no provision for automatic slack take-up. However, it should be understood that the concepts disclosed herein may be equally applicable to automatic slack adjusters.

Slack adjusters of the type described conventionally use a forging or casting for the body and there is an adjustment shaft which is positioned within a bore in the forging or body. However, the loads applied by the adjustment shaft within the bore and the loads applied by the worm gear mounted on the adjustment shaft during normal operation of the slack adjuster, are extremely high and, concentrated on portions of the slack adjuster casting or body or to the point where the life of the body is more limited than its application requires. The present invention provides for certain modifications in the body as it is formed and adapted to receive the adjustment shaft and the worm gear whereby the stresses normally applied by these elements upon the forging or body during operation are substantially reduced to the point where the life of the body has been greatly increased. Further, the distribution of previously concentrated loads permits the use of lighter weight forgings or castings.

In FIG. 1, a slack adjuster body is indicated generally at 10 and includes a lever arm 12 which has a pin connection 14 for attachment to a brake operating rod, normally connected to the vehicle brake chamber.

The slack adjuster body has an opening or cross hole 16, which may be cylindrical in major part, within which is positioned a worm gear wheel 18 splined to a brake operating shaft 20. Operating shaft 20 may form a portion of the conventional S cam operating structure of the vehicle brakes. Passage 16 passes through body 10 and worm gear wheel 18 is mounted therein. A pair of cover plates 22 are mounted either by fasteners 24 or by welding directly onto opposite sides of the body, thereby enclosing the worm gear wheel, but providing means for the operating shaft to extend therethrough.

Opening into passage 16 is a three-sided slot 30, the surfaces of slot 30 being indicated at 32, 34 and 36. End surface 36 is generally perpendicular to the axis of worm gear wheel 18, whereas the side surfaces 32 and 34 are generally perpendicular to end surface 36. The three surfaces are mutually perpendicular and are preferably formed by a broaching process. Slot 30 either directly or with the aid of inserts, closely holds and confines a worm gear 38 which is in mesh with the teeth of worm gear wheel 18.

There is a bore 40 formed in body 10 which opens into slot 30, with the bore being oversized to and mounting an adjustment shaft 42 which in turn mounts worm gear 38.

Adjustment shaft 42 extends all the way through the worm gear 38 and into a socket or bore 43 on the other side of the slot 30 and which may be viewed as an extension of bore 40. It will be noted that the end of shaft 42 is smaller than and therefore out of contact with the walls of the socket 43.

It will be noted that the shaft 42 is undersized and therefore, out of contact with bore 40 and its extension 43. This is to say that in effect the shaft floats relative to the bore. When the lever arm 12 is moved either right or left which tends to cause rotation of the body relative to the brake operated shaft 20, the worm gear 38 will tend to follow the worm wheel which will tend to cock or cant shaft 42 in the bore 40 and its extension 43. The clearance between the shaft 42 and bore 40, 43 should be controlled and established such that shaft 42 will be limited in such movement by the end of the shaft contacting either the bottom or the top of the socket 43 and the body of the shaft contacting either the top or the bottom of bore 40, contact being made on top at one side and on the bottom at the other. So while a free floating condition of shaft 42 is important, it is also important that the float allows the shaft to contact the wall of the bore on the top on one side and the bottom on the other in response to and to limit the worm gear's following the worm wheel.

There is a counterbore or enlarged bore portion 44 which positions a coil spring 46 coaxially with shaft 42 and mounts a bushing 48 upon the shaft. The invention should not be limited to the particular means shown for limiting shaft rotation. Shaft 42 may have a machined hexhead 50 for use in manual adjustment and conventionally when such adjustment is to take place, bushing 48 will be moved inwardly against the force of spring 46 to permit full access to hexhead 50.

Positioned within slot 30 may be a hardened alloy steel insert 52, for example, 4140 Steel hardend to Rockwell C48/53, which may extend the width of the slot and which has an interior curved surface 54 generally formed to fit about the outer diameter of worm gear 38. The opposite side 56 of insert 52 is formed to substantially coextensively fit against end surface 36 of slot 30. Thus, any force applied by the worm gear teeth upon the interior surface 54 of the insert, will be substantially distributed by the hardened steel insert upon end surface 36 of the body. Insert 52 floats free and is centered hy the worm gear which in turn is centered by its engagement with worm gear wheel 18. One of the advantages of this design is that by allowing float, the worm gear automatically centers the worm which in turn automatically centers the insert and thus permits an oversized bore 40 to eliminate close tolerances.

The insert illustrated in FIG. 4 at 53 is generally of a size and shape to fit against side wall 34 in slot 30 and has a generally central opening or bore 55 to accommodate the end of shaft 42. Thus, insert 53 is designed to protect wall 34 against force applied by the worm against that wall during operation of the slack adjuster. Again, the insert will float free other than being positioned upon the shaft and will be centered by the shaft within slot 30. In like manner a similar insert may be used to protect wall 32.

FIG. 5 illustrates an insert 57 which is in effect a combination of the inserts of FIGS. 3 and 4 in that it has a wall portion 59 similar in size and shape to the insert of FIG. 4 and an upper portion 61 similar in size and shape to insert 52. There is a bore in wall portion 59 similar to opening or bore 55 so that the insert may be positioned upon shaft 42 in the manner described above. The insert will function to protect both walls 34 and 36 of opening 30 and again will be floating within the opening 30 other than the positioning provided by shaft 42.

In normal operation of the slack adjuster, an operating force will be applied to lever arm 12 in either the direction of arrow 60 or arrow 62. Assuming the force is in the direction of arrow 60, such force will apply a clockwise torque to worm gear wheel 18, with the pressure angle of the teeth on worm gear wheel 18 causing worm gear 38 to move upwardly within slot 30 and to the left. The movement to the left of the worm gear will apply a force to surface 32, with such force being distributed coextensively over the surface. The upward force upon the worm gear will cause the teeth thereof to move a minimal distance before being in contact with interior surface 54 of insert 52, whereby the force of the worm gear moving up in the slot will be distributed over surface 36 of slot 30 by the contact area of the crests of all the teeth of the worm. There is either none or only minimal force applied by any of the components to the bore mounting adjustment shaft 42. In prior slack adjuster arrangements of the type described in which the adjustment shaft was closely mounted within the slack adjuster body bore, there was substantial wear by the shaft upon the bore and the shaft in effect functioned as a lever arm causing a fretting of the interior bore surface of the body. By making the bore oversized relative to the outer diameter of the shaft, such wear and stress upon the slack adjuster body has been substantially reduced or eliminated.

By applying force in the direction of arrow 62, all of the conditions above recited for the forces in the direction of arrow 60 are equally true except that the direction of the torque to worm gear 18 will be counterclockwise and the movement of the worm will be to the right applying force to face 34.

Further, by providing the inserts described herein, it is possible to take the limited contact areas of the outer diameter of the worm gear 38, apply them to the hardened steel insert, and then disperse or distribute the resulting upwardly-directed force caused by torque applied to worm gear 18 over substantially the entire area 36 of slot 30. The result for the specific construction shown and described herein is a distribution of stress and forces and consequent wear over substantial areas of the body, thereby eliminating stress concentrations which often result in fatigue and serious damage to the slack adjuster body. A direct advantage in the elimination of stress concentrations in the slack adjuster body is that it substantially reduces the cost of the body in that the entire body, or particularly those areas subject to stress, do not have to be further treated to provide a degree of hardness necessary to withstand the applied stress. By using one or more of the described inserts, it is possible to eliminate the stress concentrations and thereby provide a slack adjuster body at substantially less cost.

In FIG. 6, a variant form has been shown in which the worm gear 64 does not have a bore or passage that goes all the way through but rather has a socket 66 of limited depth at or adjacent one end so that the worm gear will not have thin cross sections throughout which, as a result of heat treat, may cause brittleness, points of stress concentration and thermal cracks. The socket 66 has an insert 68 positioned therein which has a projection 70 on the outer face extending toward the adjustment rod or shaft 72. The end of shaft 72 during assembly is of a constant diameter with possibly a pinned hole or dimple in the end thereof. The insert 68 is positioned in socket 66 and the shaft 72 is inserted and the two forced together under substantial pressure. The riser or projection 70 will cause the end area of the shaft to be swaged or coined outwardly as at 74 into a groove or channel 76 formed in the worm gear around the projection 70. The groove or channel 76 may extend all the way around throughout the full 360° or it may be in disconnected segments depending upon what degree or extent of interlock is desired measured against the force required to swage or interfit the worm gear and adjustment shaft.

Figure 7:
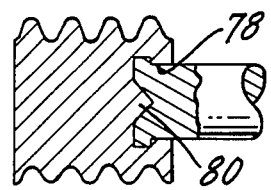
FIG. 7 is a partial like FIG. 6 of a further variant.

In FIG. 7, a variant form has been shown in which an insert is not used but rather the bottom surface of the socket 78 in the worm gear is machined or formed with a projection 80. This has the advantage that the overall socket is not as deep as the one in FIG. 6. On the other hand, the FIG. 6 form has the advantage that the use of an insert is easier and less expensive than the machining required to create the integral projection 80 in FIG. 7.

The result of either or both is that the two parts are swaged together without a full press fit such as in the FIG. 1 form. In addition, there are no thin cross-sections between the roots of the threads on the outside of the worm gear and the inner surface of the bore except to a limited extent at one end.

Figure 8:
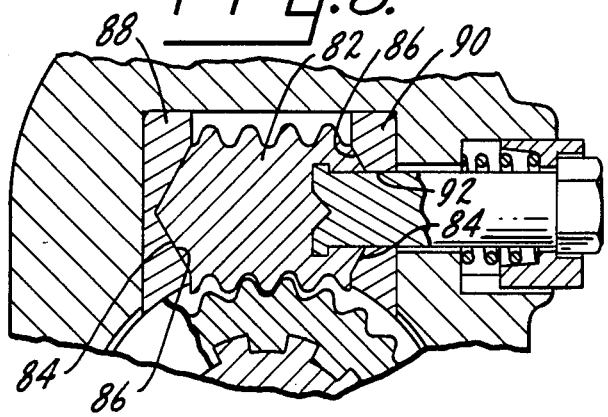
FIG. 8 is like FIG. 6 but of still a further variant.

In FIG. 8, a further variant has been shown in which the worm gear 82, instead of having flat end faces as shown in the previous forms, has conical portions 84 at each end which are convexed outwardly and interfit in corresponding inwardly conical sockets 86 in inserts 88 and 90 at each end. The inserts 88 and 90 are similar except that a bore or hole 92 extends through insert 90 to accept the adjustment shaft. If the arrangement of FIG. 8 is desired in a slack adjuster where the adjustment shaft goes all the way through, as in FIG. 1, then the two inserts 88 and 90 could be very similar if not identical i.e, like insert 90.

The inserts 88 and 90 perform the same as and are for the purposes set forth previously in connection with the inserts described in FIGS. 4 and 5, it being understood that the conical socketing at each end has the advantage that the worm gear will not be allowed to follow worm wheel movement as much.

Figure 9:
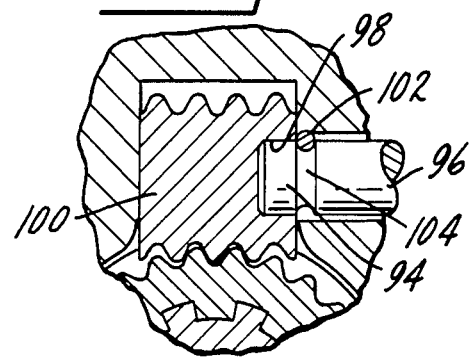
FIG. 9 is similar to FIGS. 6-9 but of an alternate form.

In FIG. 9, a further variant has been shown in which the end 94 of the adjustment shaft 96 is press fitted and/or splined into a shallow socket 98 in the side or end of the worm gear 100. The body of the slack adjuster is provided with a cross passage which receives a pin 102 that is aligned with a groove 104 formed in the adjustment shaft. The pin 102 extends through the body and its ends are covered by the conventional cover plates such as 22 in FIG. 2. The result is that the force of any attempted pullout between the adjustment shaft and worm gear will be taken by the pin 102. Thus, the interfit or socketing or splining between the end 94 of the adjustment shaft and the socket 98 does not have to be as great or as effective because the pullout or separating load will be carried through the pin 102 to the body itself.

Figure 10:
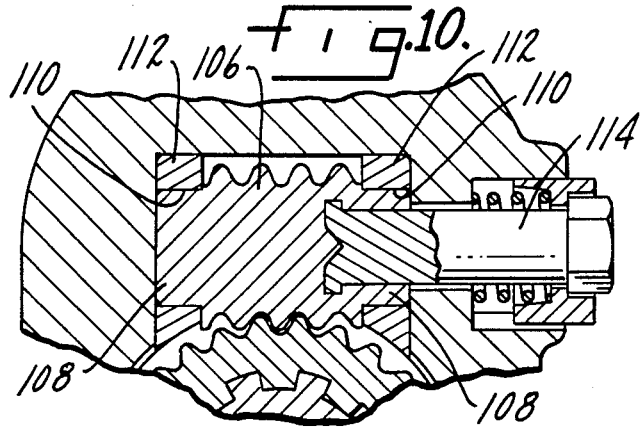
FIG. 10 is similar to FIGS. 6 and 8 and of a further variant.

In FIG. 10, a further variant has been shown in which the ends of the worm gear 106 are provided with extensions or trunions 108 which fit into bores or bearing areas or holes 110 in the side inserts 112. The particular interfit or connection between the worm gear and adjustment shaft 114 is generally of the type shown in FIG. 7, but it could be any of the others such as the type that uses an insert as in FIG. 6, a cross pin as in FIG. 9, or a splined press fit as in FIG. 1.

Figure 11:
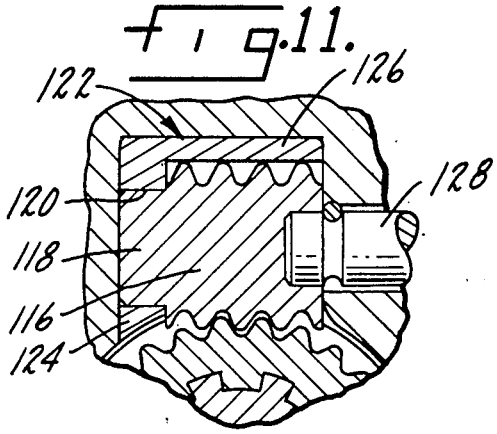
FIG. 11 is similar to FIGS. 6-10 but of a further modification.

In FIG. 11 a further variation has been shown in which the worm gear 116 in some respects is similar to the one shown in FIG. 10 in that it may have a trunnion 118 at the outer end thereof fitted into a socket or bearing or opening 120 in an insert 122 which is like the one shown in FIG. 5 in that it has a depending leg or side element 124 with the bearing opening 120 and a top or outer piece 126. It will be understood that in the forms both in FIGS. 10 and 11 there is a small amount of play between the cylindrical trunnion and the hole in the insert so that the worm gear is, in a sense, free to float. While the arrangement shown in FIG. 11 has been illustrated as having a cylindrical trunnion fitted in a cylindrical bearing hole, it should be understood that it may be like in FIG. 8, meaning that the extended portion of the worm gear, instead of being a cylindrical trunnion, could be more in the nature of a cone fitted into a conical socket in the insert. In FIG. 11 the particular connection between the adjustment shaft 128 and the worm gear is of no significance an has not been shown in detail.

Figure 12:
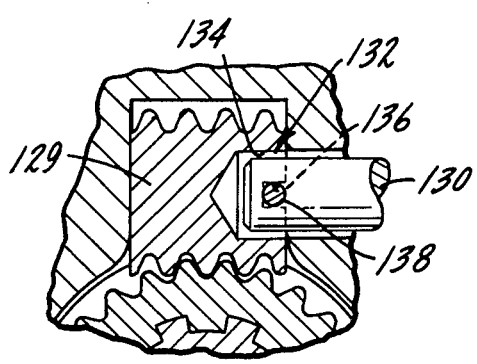
FIG. 12 is similar to FIGS. 6-11 and of an additional variation.

In FIG. 12 avariant form has been shown in which the worm gear 129 is connected to the adjustment shaft 130 by what is similar to a universal joint 132. The connection includes an oversized hole 134 in the end face of the worm gear with a cross slot 136 in the end face of the worm gear which crosses or extends through the socket or hole 134. A pin 138 extends through the cross slot and through the end of the adjustment shaft. The fits are all loose or oversized so that the connection allows the worm gear 129 and adjustment shaft 130 to move rather freely relative to each other. The result is that the forces transmitted to the worm gear 129 by the gear wheel will not be transmitted to the adjustment shaft 130. It should be understood, of course, that various types of inserts may be used such as those shown and described in the prior figures.

Whereas the preferred form of the invention has been shown and described herein, it should be realized that there may be many modifications, substitutions and alterations thereto.

The embodiments of the invention in which an exclusive property or privilege is claimed are defined as follows:

1. In a slack adjuster for use in a transportation environment, a body having a lever arm, a passage in said body, and a worm gear wheel for mounting on a brake shaft positioned in said body passage, a slot formed in said body and opening into the passage, said slot having three mutually perpendicular surfaces, one end surface and two side surfaces, and being of a size and shape to hold a worm gear and providing for threaded engagement of said worm gear wheel and worm gear, a bore in said body and generally perpendicular to at least one of said slot surfaces, a shaft positioned in said bore and coaxially mounting said worm gear for adjustment thereof, said bore being oversized relative to said shaft and providing little or no bearing support therefor whereby when a torque is applied to said worm gear wheel resulting from a force applied to the lever arm, the worm gear exerts forces normal to two of the surfaces of the slot.

2. The slack adjuster of claim 1 further characterized in that said slot end surface provides minimal clearance with the outer diameter of said worm gear, whereby a torque applied to said worm gear wheel from said body lever arm applies a resultant force upon said worm gear perpendicular thereto and causes only minimal movement of said worm gear prior to surface contact between said worm gear outer diameter and said slot end surface.

3. The slack adjuster of claim 2 further characterized by and including an insert positioned in said slot with one surface thereof having a curvature approximating that of said worm gear outer diameter and the opposite surface thereof being positioned for substantial coextensive contact with said slot end surface, whereby the force applied by said worm gear wheel to said worm gear will be distributed by said insert substantially over said slot surface.

4. The slack adjuster of claim 2 further characterized by and including an insert positioned in said slot for substantial coextensive contact with one of said slot perpendicular surfaces.

5. The slack adjuster of claim 1 further characterized by and including an insert positioned in said slot with one surface thereof having a curvature approximating that of said worm gear outer diameter and the opposite surface thereof being positioned for substantial coextensive contact with another slot end surface, said insert further having a portion positioned for substantial coextensive contact with one of the slot side surfaces.

6. The structure of claim 1 further characterized in that the bore in the body extends through both of the side surfaces of the slot.

7. In a slack adjuster for use in a transportation environment, a body having a lever arm, a passage in the body, a worm gear wheel in the body passage constructed and adapted to be mounted on a brake shaft, a slot formed in the body opening into the passage, the slot having three mutually perpendicular surfaces and being of a size and shape to hold a worm gear to provide for threaded engagement between the worm gear wheel and worm gear, a bore in the body generally perpendicular to at least one surface of the slot and opening through the side of the body, an adjustment shaft positioned in the bore coaxially mounting the worm gear for adjustment, the bore being over size relative to the adjustment shaft and providing little or no bearing surface therefore, whereby when a torque is applied to the worm gear wheel resulting from a force applied to the lever, the worm gear exerts forces normal to two of the surfaces of the slot.

8. The structure of claim 7 further characterized in that the bore extends through the slot and is perpendicular to two of the slot's surfaces.

9. The structure of claim 7 further characterized in that the worm gear is press fitted on the shaft.

10. The structure of claim 7 further characterized in that the worm gear has a socket at one end and the shaft is press fitted into the socket.

11. The structure of claim 7 further characterized by and including an insert positioned in the slot at each end of the worm gear.

12. The structure of claim 7 further characterized in that the shaft is press fitted into a socket in one end of the worm gear.

13. The structure of claim 12 further characterized in that the socket in one end of the worm gear includes a generally axially disposed projection extending toward the open end of the socket and generally aligned with the center of the shaft, and an internal groove around the inside of the socket opposite and around the projection so that when the shaft is press fitted into the socket, the projection will cause the exterior of the end of the shaft to flow outwardly into and thereby interlock in the groove.

14. The structure of claim 13 further characterized in that the projection is integral with the worm gear.

15. The structure of claim 13 further characterized in that the projection is formed on an insert which is positioned in the socket.

16. The structure of claim 7 further characterized by and including an insert positioned at each end of the worm gear opposite and providing generally co-extensive contact with the side surfaces of the slot.

17. The structure of claim 16 further characterized in that the ends of the worm gear are convexly conical and are fitted into corresponding concave sockets in the inserts.

18. The structure of claim 16 further characterized in that the ends of the worm gear have generally cylindrical trunion areas which are socketed into corresponding bearing areas in the inserts.

19. The structure of claim 12 further characterized by and including a locking pin extending through the body and received in an annular groove in the adjustment shaft to resist pullout loads on the adjustment shaft.

20. The structure of claim 17 in that the inserts positioned at each end of the worm gear extend vertically from contact with the worm gear wheel to contact with the end surface of the slot.

21. The structure of claim 17 further characterized in that the inserts positioned at each end of the worm gear extend vertically from contact with the worm gear wheel to co-extensive contact with the end surface of the slot.

22. The structure of claim 18 in that the inserts positioned at each end of the worm gear extend vertically from contact with the worm gear wheel to contact with the end surface of the slot.

23. The structure of claim 18 further characterized in that the inserts positioned at each end of the worm gear extend verticially from contact with the worm gear wheel to co-extensive contact with the end surface of the slot.

24. The structure of claim 5 further characterized in that worm gear has cylindrical trunnion on at least one end thereof and the hole in the vertical wall of the insert to accept the trunnion, the hole being slightly oversized relative to the trunnion so as to permit only a small amount of play, the vertical wall of the trunnion extending from rear contact with the worm gear wheel to the end surface of the slot.

* * * * *